United States Patent
Nitta et al.

(10) Patent No.: US 11,437,876 B2
(45) Date of Patent: Sep. 6, 2022

(54) ROTATING ELECTRICAL MACHINE

(71) Applicants: Honda Motor Co., Ltd., Tokyo (JP); Hitachi Automotive Systems, Ltd., Hitachinaka (JP)

(72) Inventors: Takayuki Nitta, Hitachinaka (JP); Yasuyuki Saito, Hitachinaka (JP); Yuji Kobayashi, Hitachinaka (JP); Manabu Yazaki, Wako (JP); Keiichiro Kashiwabara, Wako (JP); Atsushi Nishida, Wako (JP)

(73) Assignees: HONDA MOTOR CO., LTD., Tokyo (JP); HITACHI ASTEMO, LTD., Hitachinaka (JP)

( * ) Notice: Subject to any disclaimer, the term of this patent is extended or adjusted under 35 U.S.C. 154(b) by 196 days.

(21) Appl. No.: 16/626,693

(22) PCT Filed: Jun. 27, 2018

(86) PCT No.: PCT/JP2018/024292
§ 371 (c)(1),
(2) Date: Dec. 26, 2019

(87) PCT Pub. No.: WO2019/004249
PCT Pub. Date: Jan. 3, 2019

(65) Prior Publication Data
US 2020/0119602 A1  Apr. 16, 2020

(30) Foreign Application Priority Data

Jun. 29, 2017 (JP) .............................. JP2017-127299

(51) Int. Cl.
*H02K 1/27* (2022.01)
*H02K 15/03* (2006.01)
(Continued)

(52) U.S. Cl.
CPC ............. *H02K 1/274* (2013.01); *H02K 15/03* (2013.01); *H02K 21/14* (2013.01)

(58) Field of Classification Search
CPC ........ H02K 1/274; H02K 15/03; H02K 21/14; H02K 15/12; H02K 1/2766
See application file for complete search history.

(56) References Cited

U.S. PATENT DOCUMENTS

2006/0186752 A1* 8/2006 Matsumoto ............. B60L 50/51
310/156.53
2014/0077652 A1* 3/2014 Yamagishi ............... H02K 1/28
310/156.21
(Continued)

FOREIGN PATENT DOCUMENTS

JP   2006-238584 A   9/2006
JP   2014-036486 A   2/2014
(Continued)

OTHER PUBLICATIONS

International Search Report with English translation and Written Opinion issued in corresponding application No. PCT/JP2018/024292 dated Sep. 25, 2018.

*Primary Examiner* — Thomas Truong
(74) *Attorney, Agent, or Firm* — Foley & Lardner LLP

(57) ABSTRACT

The present invention provides a rotating electrical machine capable of fixing a permanent magnet at a defined position of a magnet insertion hole without providing a filling groove for injection of a filler in a rotor core and, of course, without lowering performance as the rotating electric machine. A rotating electrical machine of the present invention includes: a rotor; and a stator, the rotor including: a rotor core provided with a plurality of magnet insertion holes; a permanent magnet inserted into the magnet insertion hole; and a filler configured to fix the permanent magnet to the magnet insertion hole. In the rotating electrical machine, the
(Continued)

permanent magnet comprises: a plurality of radial end surfaces provided in a radial direction of the rotor; and a pair of circumferential end surfaces provided in a circumferential direction of the rotor, one first radial end surface out of the plurality of radial end surfaces intersects the pair of circumferential end surfaces to form two regions where a side meets a side, and gaps each of which is formed between each of the two regions where a side meets a side and an inner wall surface of the magnet insertion hole are used as filler inlets for the filler.

7 Claims, 6 Drawing Sheets

(51) Int. Cl.
    *H02K 1/274*     (2022.01)
    *H02K 21/14*     (2006.01)

(56) References Cited

U.S. PATENT DOCUMENTS

| | | | |
|---|---|---|---|
| 2014/0103574 A1 | | 4/2014 | Ishimatsu |
| 2018/0062488 A1* | | 3/2018 | Okudaira ............. H02K 1/2766 |

FOREIGN PATENT DOCUMENTS

| | | |
|---|---|---|
| JP | 2014-082807 A | 5/2014 |
| JP | 2015-220780 A | 12/2015 |
| WO | WO-2016/147211 A1 | 9/2016 |

* cited by examiner

ROTATING ELECTRICAL MACHINE

TECHNICAL FIELD

The present invention relates to a rotating electrical machine, and particularly to a rotating electrical machine suitable for a permanent magnet inserted into a magnet insertion hole provided in a rotor core, the permanent magnet fixed to the magnet insertion hole with a filler.

BACKGROUND ART

In general, a rotating electrical machine includes: an annular stator; and a rotor arranged in the stator with a predetermined clearance in a radial direction. The rotor is formed with a predetermined gap in a circumferential direction and includes: a rotor core provided with a plurality of magnet insertion holes extending in an axial direction; permanent magnets respectively inserted into the plurality of magnet insertion holes; and a filler configured to fix the permanent magnets to the magnet insertion holes.

Examples of prior art documents relating to the above-described fixation of the permanent magnet to a defined position of the magnet insertion hole using the filler can include PTL 1.

PTL 1 describes the following technique configured to accurately position and fix a permanent magnet in a magnet insertion hole for the purpose of suppressing variations in magnetic characteristics of each permanent magnet.

That is, the permanent magnet includes a first radial end surface provided in a radial direction of a rotor core; and a first circumferential end surface provided in a circumferential direction of the rotor core. The magnet insertion hole faces a corner portion of the permanent magnet where the first radial end surface and the first circumferential end surface intersect each other and has a bulging portion formed by bulging in an extending direction of the first radial end surface and an extending direction of the first circumferential end surface. The bulging portion is a filling groove configured to fill a filler for fixing of the permanent magnet. As the filler is filled from the filling groove, a second circumferential end surface located on the opposite side of the first circumferential end surface and a second radial end surface located on the opposite side of the first radial end surface of the permanent magnet are pressed against an inner wall surface of the magnet insertion hole, and the permanent magnet can be accurately positioned and fixed with respect to the magnet insertion hole.

CITATION LIST

Patent Literature

PTL 1: JP 2015-220780 A

SUMMARY OF INVENTION

Technical Problem

In the technique described in PTL 1 described above, however, as a result of providing the filling groove in the magnet insertion hole, a clearance region expands (a region where a magnetic flux passes decreases) due to the filling groove in the region where the magnetic flux of the rotor core passes so that a torque decreases, and there is a concern that the performance as a rotating electrical machine deteriorates. Therefore, it is necessary to fix the permanent magnet at a defined position of the magnet insertion hole without providing the filling groove for injection of the filler in the rotor core.

The present invention has been made in view of the above points, and an object thereof is to provide a rotating electrical machine capable of fixing a permanent magnet at a defined position of a magnet insertion hole without providing a filling groove for injection of a filler in a rotor core and, of course, without lowering performance as the rotating electrical machine.

Solution to Problem

In order to achieve the above object, a rotating electrical machine of the present invention includes: a rotor; and a stator, the rotor including: a rotor core provided with a plurality of magnet insertion holes; a permanent magnet inserted into the magnet insertion hole; and a filler configured to fix the permanent magnet to the magnet insertion hole. In the rotating electrical machine, the permanent magnet comprises: a plurality of radial end surfaces provided in a radial direction of the rotor; and a pair of circumferential end surfaces provided in a circumferential direction of the rotor, one first radial end surface out of the plurality of radial end surfaces intersects the pair of circumferential end surfaces to form two regions where a side meets a side, and gaps each of which is formed between each of the two regions where a side meets a side and an inner wall surface of the magnet insertion hole are used as filler inlets for the filler.

Advantageous Effects of Invention

According to the present invention, it is possible to obtain the rotating electrical machine capable of fixing the permanent magnet at the defined position of the magnet insertion hole without providing the filling groove for injection of the filler in the rotor core and, of course, without lowering the performance as the rotating electric machine.

DESCRIPTION OF EMBODIMENTS

Hereinafter, a rotating electrical machine of the present invention will be described based on the illustrated embodiments. Incidentally, the same reference signs will be used for the same components in each drawing.

First Embodiment

Figure 1:
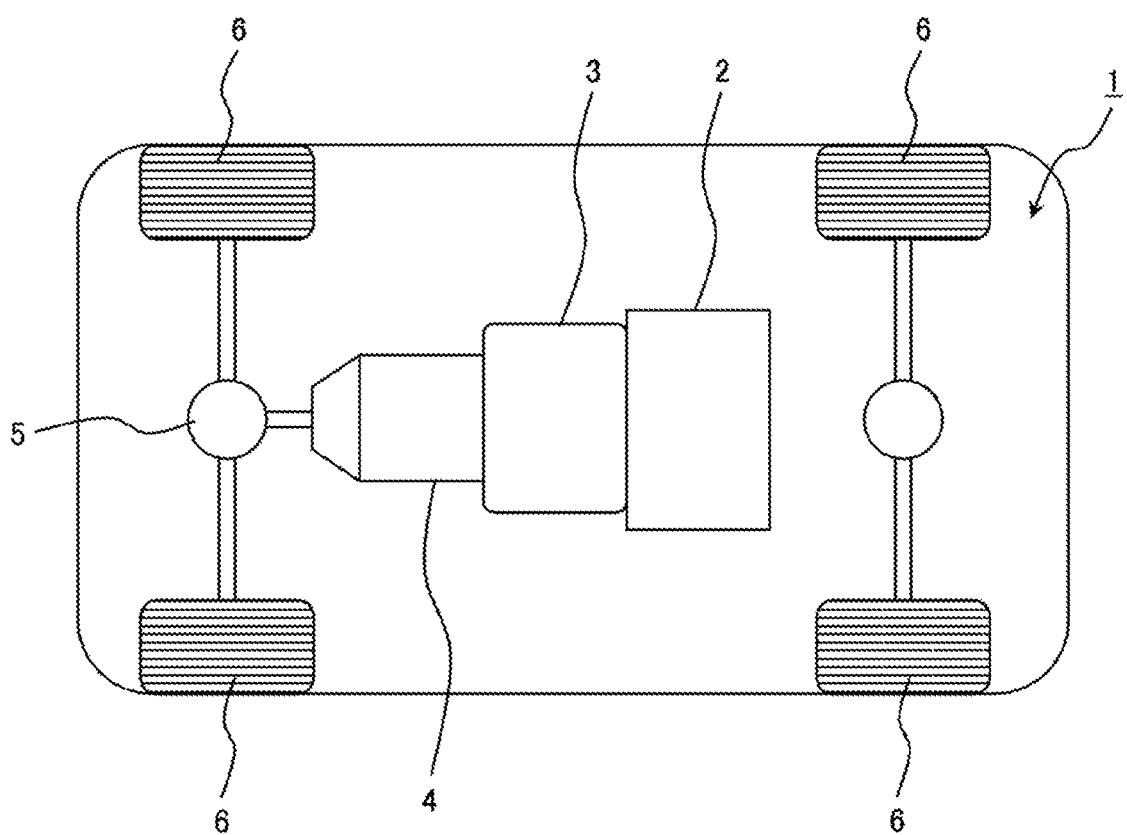
FIG. 1 is a block diagram illustrating a schematic configuration of a hybrid electric vehicle equipped with a rotating electrical machine according to a first embodiment of the present invention.

FIG. 1 illustrates a schematic configuration of a hybrid electric vehicle equipped with a rotating electrical machine according to a first embodiment of the present invention.

In the drawing, a vehicle 1 is equipped with an engine 2 and a rotating electrical machine 3 as vehicle power sources. Incidentally, two rotating electrical machines 3 serving different roles may be used in combination, and in this case, one rotating electrical machine 3 performs both power generation and vehicle driving and the other rotating electrical machine 3 serves to drive the vehicle.

A rotational torque generated by the engine 2 and the rotating electrical machine 3 is transmitted to wheels (drive wheels) 6 through a transmission 4 and a differential gear 5 such as a continuously variable transmission and a stepped automatic transmission. The rotating electrical machine 3 is mounted between the engine 2 and the transmission 4 or in the transmission 4. Therefore, the rotating electrical machine 3 is required to have a small size and high output in order to minimize influence of a space on the vehicle 1.

Figure 2:
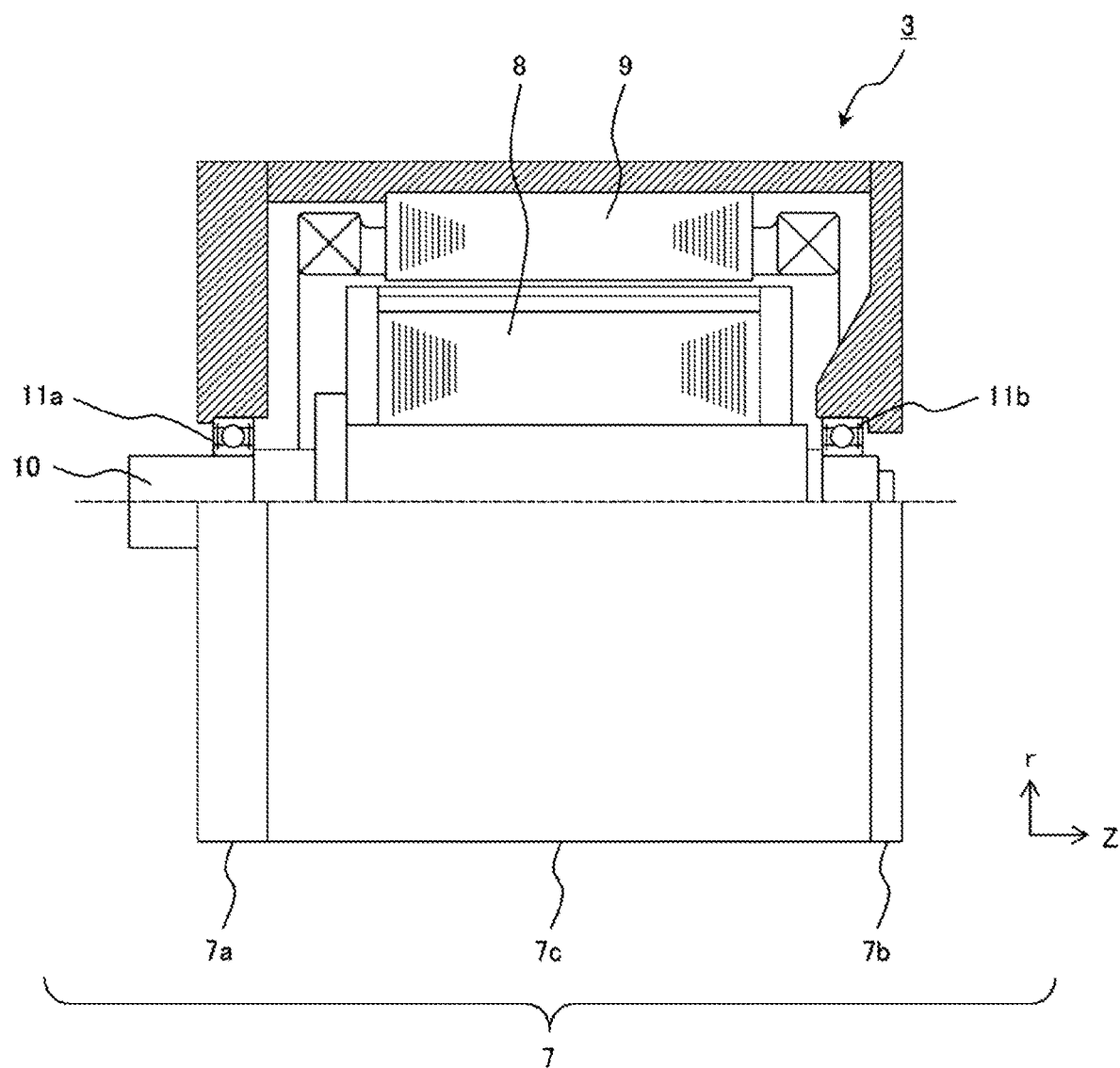
FIG. 2 is a view of a schematic configuration of the rotating electrical machine according to the first embodiment of the present invention and illustrates an upper region in a cross section and a lower region in a side view, the upper region and the lower region sandwiching a shaft.

FIG. 2 schematically illustrates the rotating electrical machine 3 illustrated in FIG. 1, and illustrates an upper region in a cross section and a lower region in a side surface, the upper region and the lower region sandwiching a shaft 10.

As illustrated in the drawing, the rotating electrical machine 3 is housed and arranged inside a case 7 constituted by a front bracket 7a, a rear bracket 7b, and a housing 7c. Here, the case 7 may be an integral case constituted by the front bracket 7a and the housing 7c or may be an integral case constituted by the rear bracket 7b and the housing 7c.

Further, when the rotating electrical machine 3 is arranged between the engine 2 and the transmission 4, the case 7 is configured using a case of the engine 2 or a case of the transmission 4 as illustrated in FIG. 1. Further, when the rotating electrical machine 3 is mounted in the transmission 4, the case 7 is configured using the case of the transmission 4.

Further, the rotating electrical machine 3 includes a rotor 8 and a stator 9. An outer circumferential side of the stator 9 is fixed to an inner circumferential side of the housing 7c, and the rotor 8 is arranged on an inner circumferential side of the stator 9 with a predetermined clearance. The rotor 8 is fixed to the shaft 10 and rotates integrally with the shaft 10. Both ends of the shaft 10 are rotatably supported by the front bracket 7a and the rear bracket 7b by bearings 11a and 11b, respectively.

Figure 3:
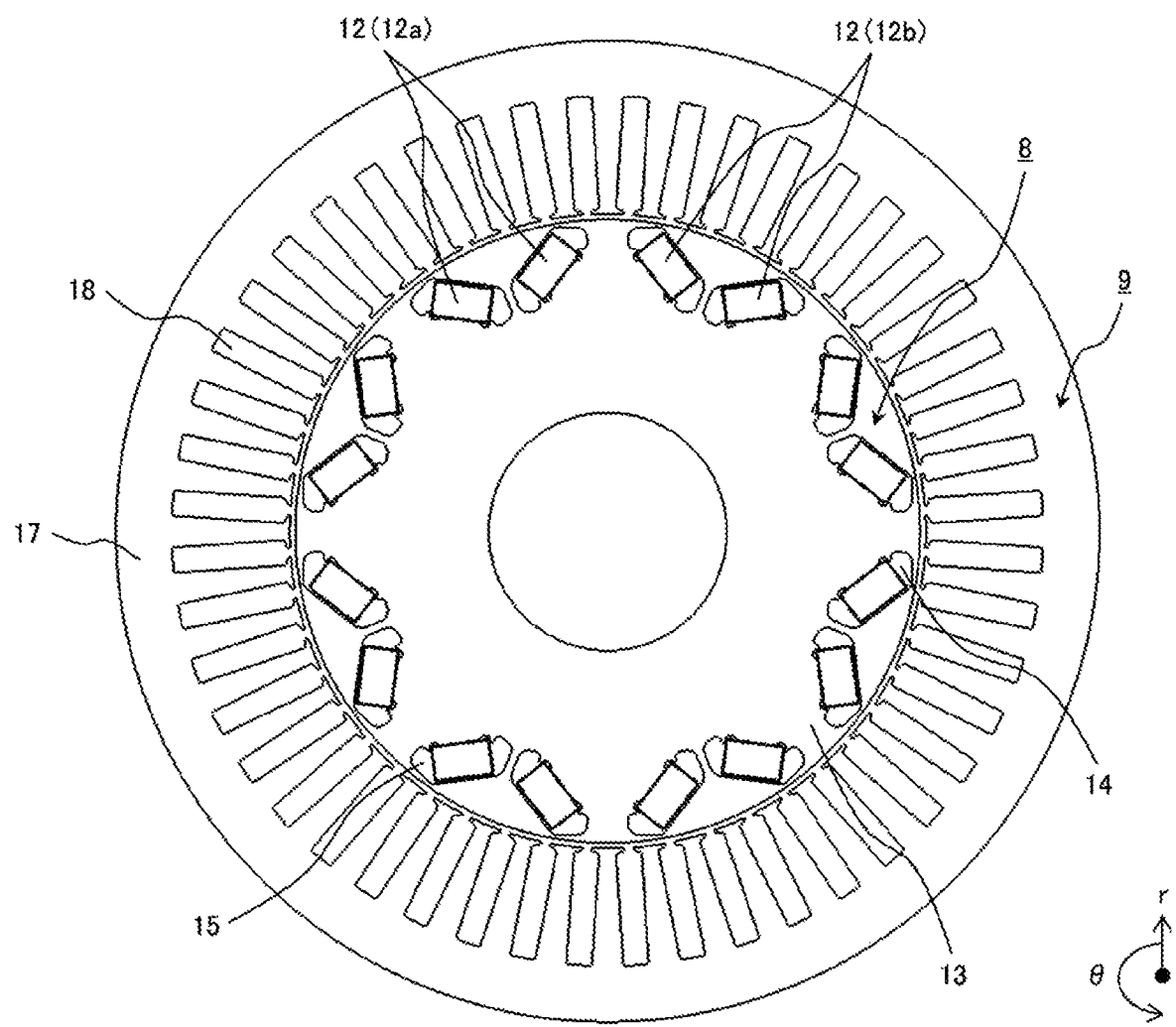
FIG. 3 is a front view illustrating a rotor and a stator in the first embodiment of the rotating electrical machine of the present invention.
Figure 4:
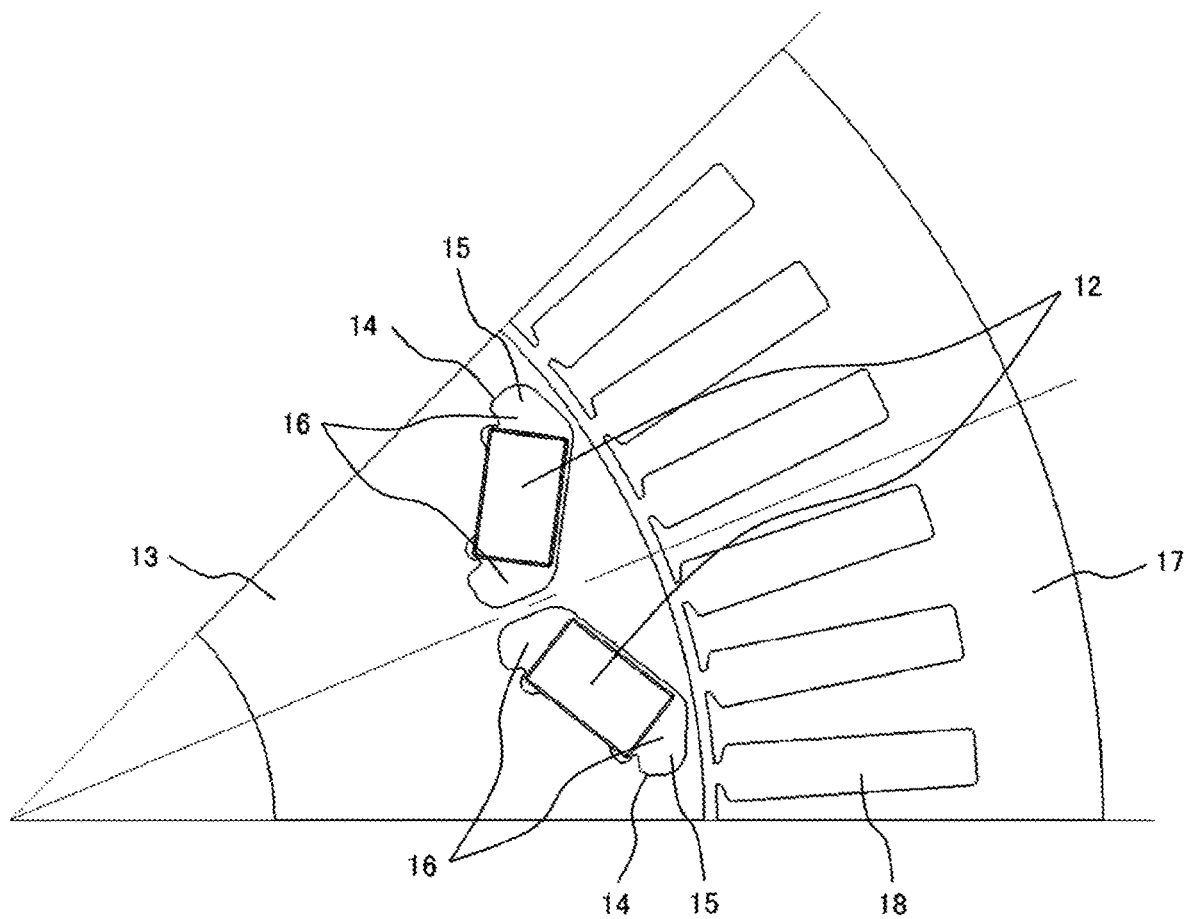
FIG. 4 is an enlarged view illustrating one magnetic pole portion of the stator and the rotor in FIG. 3.

Next, the rotor 8 and the stator 9 of the present embodiment will be described with reference to FIGS. 3 and 4. Incidentally, FIG. 3 is a front view illustrating the rotor 8 and the stator 9 of the rotating electrical machine 3 of the present embodiment, and FIG. 4 is an enlarged view of one magnetic pole portion of the stator 8 and the rotor 9 of the rotating electrical machine 3 of the present embodiment.

As illustrated in the drawing, the rotating electrical machine 3 of the present embodiment includes the rotor 8 and the stator 9. The rotor 8 is schematically constituted by: a rotor core 13 provided with a plurality of magnet insertion holes 14; permanent magnets 12 respectively inserted into the plurality of magnet insertion holes 14; and a filler 15 configured to fix the permanent magnet 12 to the magnet insertion hole 14.

Specifically, the rotor 8 arranged on the inner circumferential side of the stator 9 with the predetermined clearance has eight poles in which sixteen permanent magnets 12 are arranged in the θ direction (two pieces per pole), and is a three-phase AC of which the number of slots per phase per pole is two, and thus, the number of slots 18 in the stator core 17 of the stator 9 is 48 (8×3×2).

In the vicinity of an outer circumference of the rotor core 13 of the rotor 8, a plurality of, that is, sixteen magnet insertion holes 14 described above for insertion of the rectangular permanent magnets 12 are arranged at equal intervals along the θ direction (circumferential direction).

Each of the magnet insertion holes 14 is formed to extend in a z direction (axial direction), and the permanent magnets 12 are embedded in the respective magnet insertion holes 14 and fixed with the filler 15.

A width of the magnet insertion hole 14 in the θ direction (circumferential direction) is set to be larger than a width of the permanent magnet 12 (12a, 12b) in the θ direction (circumferential direction), and hole spaces 16 on both sides of the permanent magnet 12 function as magnetic clearances. The hole space 16 may be embedded with a thermosetting resin or may be solidified integrally with the permanent magnet 12 using a thermoplastic resin. The permanent magnet 12 acts as a field pole of the rotor 8, and has an eight-pole configuration in the present embodiment.

As the above filler 15, a thermosetting resin or a thermoplastic resin can be used. However, in a process after injection of the filler 15, a curing process is required in the case of the thermosetting resin since curing is performed by heating, but the curing process is not necessary in the case of the thermoplastic resin since the thermoplastic resin heated at the time of injection of the filler is cured by returning to a normal temperature. Therefore, the filler 15 is preferably the thermoplastic resin rather than the thermosetting resin when considering the productivity of the rotating electrical machine 3.

Further, a magnetization direction of the permanent magnet 12 is oriented in a direction perpendicular to a long side of the permanent magnet 12, and the orientation of the magnetization direction is reversed for each field pole. That is, when assuming that a surface of the permanent magnet 12a on the stator side is an N pole and a surface of the permanent magnet 12a on the axis side is an S pole in FIG. 3, a surface of the adjacent permanent magnet 12b on the stator side is an S pole and a surface of the permanent magnet 12b on the axis side is an N pole. Further, these permanent magnets 12a and 12b are alternately arranged in the θ direction (circumferential direction).

Further, the permanent magnet 12 may be inserted into the magnet insertion hole 14 after being magnetized or may be magnetized by applying a strong magnetic field after being inserted into the magnet insertion hole 14 of the rotor core 13. However, since the magnetized permanent magnet 12 is a strong magnet, a strong attractive force is generated between the rotor core 13 and the permanent magnet 12 at the time of fixing the permanent magnet 12 to hinder assembling work if the magnet is magnetized before fixing the permanent magnet 12 to the rotor 8.

Further, there is a risk that dust such as iron powder may adhere to the permanent magnet 12 due to a strong attractive force of the permanent magnet 12. Thus, magnetization is preferably performed after inserting the permanent magnet 12 into the rotor core 13 in consideration of the productivity of the rotating electrical machine 3.

Meanwhile, the above-described permanent magnet 12 is fixed to the magnet insertion hole 14 by the filler 15. It was necessary to provide a filling groove in the vicinity of the magnet insertion hole 14, which is a region through which a magnetic flux passes, in the related art in order to fill the magnet insertion hole 14 with the filler 15. As a result, since there is the filling groove in the region through which the magnetic flux of the rotor core 13 passes, a clearance region expands (the region through which magnetic flux passes decreases) so that a torque decreases, and there is a concern that the performance as the rotating electrical machine 3 decreases.

Therefore, even if there is no setting of the filling groove in the rotor core 13, it is necessary to fill the magnet insertion hole 14 with the filler 15 and fix the permanent magnet 12 at a defined position with respect to the magnet insertion hole 14.

On the other hand, there is a concern for the rotor core 13 in which a plurality of electromagnetic steel sheets are stacked that a stacking step molded by stacking deviation of the electromagnetic steel sheets may occur, and stress is concentrated at a portion that is in local contact with the permanent magnet 12 on which a centrifugal force is applied during rotational driving due to the influence of such a stacking step, which cause damage of the permanent magnet 12 and the electromagnetic steel sheet.

Figure 5:
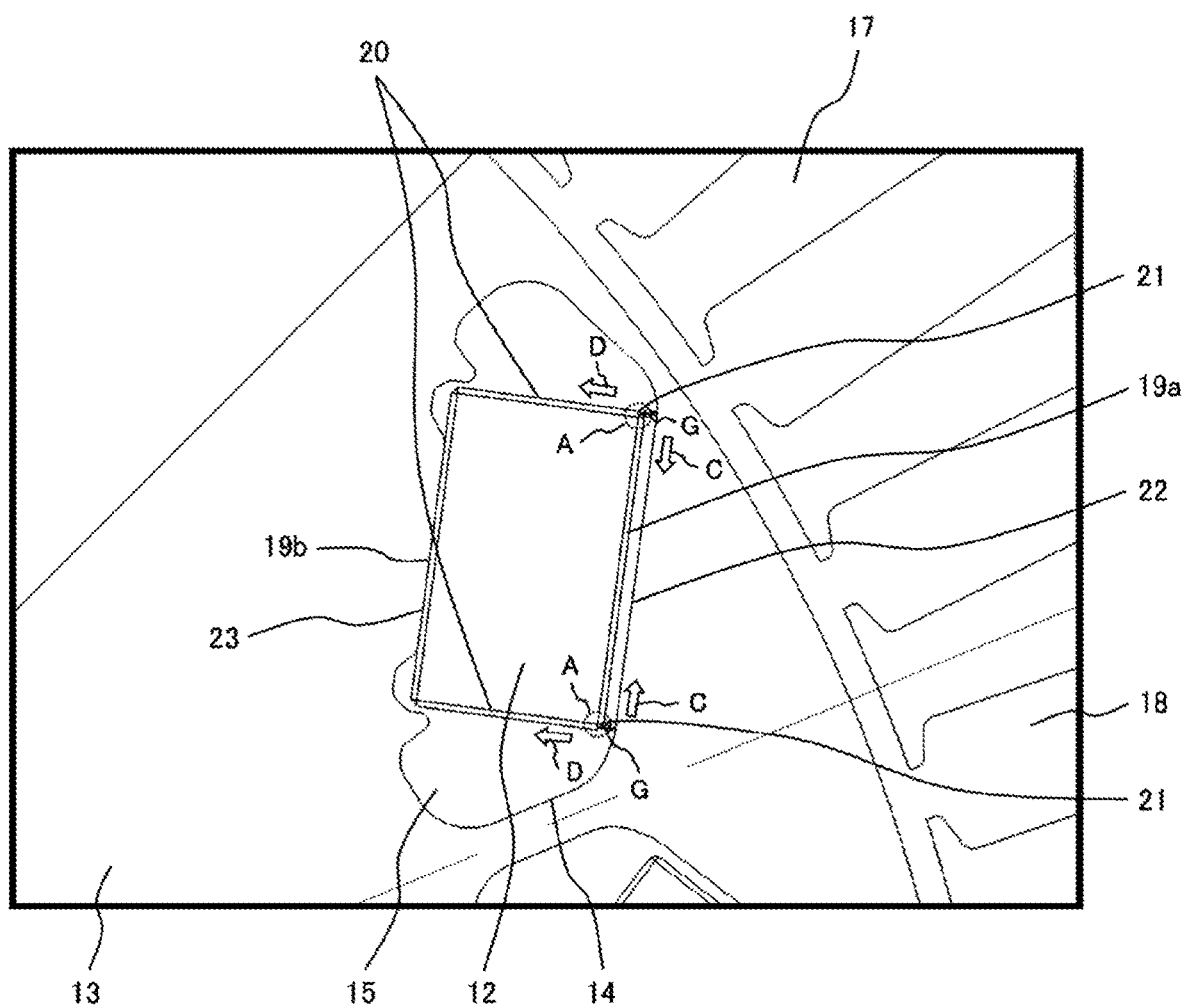
FIG. 5 is an enlarged view illustrating the vicinity of a magnet insertion hole in FIG. 4.

Therefore, in order to avoid the above-described local contact of the permanent magnet 12, it is necessary to interpose the filler 15 between a first radial end surface 19a located on the outer circumferential side of the permanent magnet 12 and an inner wall surface of the magnet insertion hole 14 as illustrated in FIG. 5. That is, it is preferable that the permanent magnet 12 with respect to the magnet insertion hole 14 be located on the inner side.

Therefore, in the present embodiment, in the permanent magnet 12, the first radial end surface 19a (or 19b) out of a plurality of end surfaces of the rotor 8 provided in a radial direction, and a pair of circumferential end surfaces 20 provided in the circumferential direction of the rotor 8 are provided such that the one first radial end surface 19a and the pair of circumferential end surfaces 20 intersect each other to provide two regions A where a side meets a side, and gaps G each of which is formed between each of the two regions A where a side meets a side and the inner wall surface of the magnet insertion hole 14 are used as filler inlets of the filler 15 as illustrated in FIG. 5. Thus, the permanent magnet 12 can be fixed at the defined position with respect to the magnet insertion hole 14 without providing the filling groove in the region through which the magnetic flux of the rotor core 13 passes.

Specifically, in the present embodiment, the permanent magnet 12 includes the first radial end surface 19a and the pair of circumferential end surfaces 20 provided in the circumferential direction of the rotor 8, and two corner portions 21 of the first radial end surface 19a intersecting with the pair of circumferential end surfaces 20 (two portions where a side meets a side in the two regions where a side meets a side of the first radial end surface 19a intersecting the pair of circumferential end surfaces 20) are chamfered. Even if there is no filling groove in the rotor core 13, the gaps G each of which is formed between each of the two corner portions 21 and the inner wall surface of the magnet insertion hole 14 are used as the filler inlets for the filler 15 to fill the filler 15 from these filler inlets so that the permanent magnet 12 can be fixed at the defined position with respect to the magnet insertion hole 14 without providing the filling groove in the region through which the magnetic flux of the rotor core 13 passes.

Further, even if there is the stacking step formed by the stacking deviation in the electromagnetic steel sheets of the rotor core 13, the filler 15 is interposed between the first radial end surface 19a located on the outer circumferential side of the permanent magnet 12 and the inner wall surface of the magnet insertion hole 14, and thus, the permanent magnet 12 is not brought into local contact with the electromagnetic steel sheet even if a centrifugal force is applied during rotational driving so that the permanent magnet 12 and the electromagnetic steel sheet are not damaged.

Further, the gaps (gaps each of which is formed between each of the two regions A where a side meets a side and the inner wall surface of the magnet insertion hole 14) G formed by the chamfered shapes of the two corner portions 21 of the permanent magnet 12 are used so that there is no filling groove as in PTL 1 in the region through which the magnetic flux of the rotor core 13 passes. Therefore, an outer circumferential end surface (an inner wall surface facing the first radial end surface 19a of the permanent magnet 12) 22 of the magnet insertion hole 14, which faces the first radial end surface 19a of the permanent magnet 12, can be made into a linear shape without a groove as illustrated in FIG. 5. That is, an inflection point (groove) is not formed in a region facing the first radial end surface 19a of the permanent magnet 12 on the outer circumferential end surface (the inner wall surface facing the first radial end surface 19a of the permanent magnet 12) 22 of the magnet insertion hole 14.

As a result, since there is no inflection point in the region facing the first radial end surface 19a of the permanent magnet 12 of the outer circumferential end surface 22 of the magnet insertion hole 14, it is possible to narrow a clearance region (the clearance region does not expand) in the region through which the magnetic flux of the rotor core 13 passes (between the two regions (between the corner portions 21) where a side meets a side of the first radial end surface 19a intersecting the pair of circumferential end surfaces 20 in FIG. 5), and it is possible to suppress deterioration in performance of the rotating electrical machine 3 caused by a torque decrease.

Further, when the filler 15 is injected from the two corner portions 21 of the permanent magnet 12, the filler 15 flows between the first radial end surface 19a of the permanent magnet 12 and the outer circumferential end surface 22 of the magnet insertion hole 14 (in a direction of an arrow C in FIG. 5) and toward the hole spaces 16 located on both sides in the circumferential direction of the magnet insertion hole 14 (in a direction of an arrow D in FIG. 5). As a result, the permanent magnet 12 moves in a direction perpendicular to the outer circumferential end surface 22 of the magnet insertion hole 14 and is fixed at a position pressed against an inner circumferential end surface 23 of the magnet insertion hole 14 facing the outer circumferential end surface 22 of the magnet insertion hole 14.

When the filler 15 is injected from one filler inlet, there is a concern that the filler 15 does not flow evenly inside the magnet insertion hole 14 and the permanent magnet 12 is fixed in a tilted state. Thus, it is preferable to inject the filler 15 from the gaps (gaps each of which is formed between each of the two regions A where a side meets a side and the inner wall surface of the magnet insertion hole 14) G formed by the chamfered shapes of the two corner portions 21 of the permanent magnet 12, that is, two filling inlets as in the present embodiment.

Incidentally, the corner portion 21 of the permanent magnet 12 has the chamfered shape in the present embodiment, but the same effect can be obtained, for example, even when the corner portions (two portions where a side meets a side of the two regions where a side meets a side of the first radial end surface 19*a* intersecting the pair of circumferential end surfaces 20) 21 of the permanent magnet 12 have a shape, such as a corner R shape, that can form the gaps G with the inner wall surface of the magnet insertion hole 14.

Further, the gaps G each of which is formed between each of the two regions A where a side meets a side of the first radial end surface 19*a* intersecting the pair of circumferential end surfaces 20 of the permanent magnet 12 and the inner wall surface of the magnet insertion hole 14 are used as the filler inlets for the filler 15 in the present embodiment, but gaps each of which is formed between each of two regions A where a side meets a side of the first radial end surface 19*b*, which is opposite to the first radial end surface 19*a* and intersects the pair of circumferential end surfaces 20 of the permanent magnet 12, and the inner wall surface of the magnet insertion hole 14 may be used as the filler inlets of the filler 15. In this case, the first radial end surface 19*a* of the permanent magnet 12 is pressed against the outer circumferential end surface 22 of the magnet insertion hole 14.

Further, it is possible to consider a case of the opposite side of FIG. 3, that is, the case where an opposing side of the two permanent magnets 12 facing each other protrudes to the outer circumferential side or a case where a longitudinal direction of one permanent magnet 12 is arranged in a radial direction of the rotor 8 or in a direction perpendicular to the radial direction of the rotor 8, as the arrangement of the permanent magnet 12 in addition to the arrangement of the permanent magnet 12 as illustrated in FIG. 3. Even with such an arrangement of the permanent magnets 12, the filler 15 can be filled in the same manner as in the above-described embodiment.

Next, a description will be given with reference to FIGS. 6 and 7 regarding the injection of the filler 15 when the gaps (gaps each of which is formed between each of the two regions A where a side meets a side and the inner wall surface of the magnet insertion hole 14) G, formed by the chamfered shapes of the two corner portions 21 of the permanent magnet 12 in the present embodiment, are used as the filling inlets. Incidentally, FIG. 7 is an enlarged view of a part B in FIG. 6.

Figure 6:
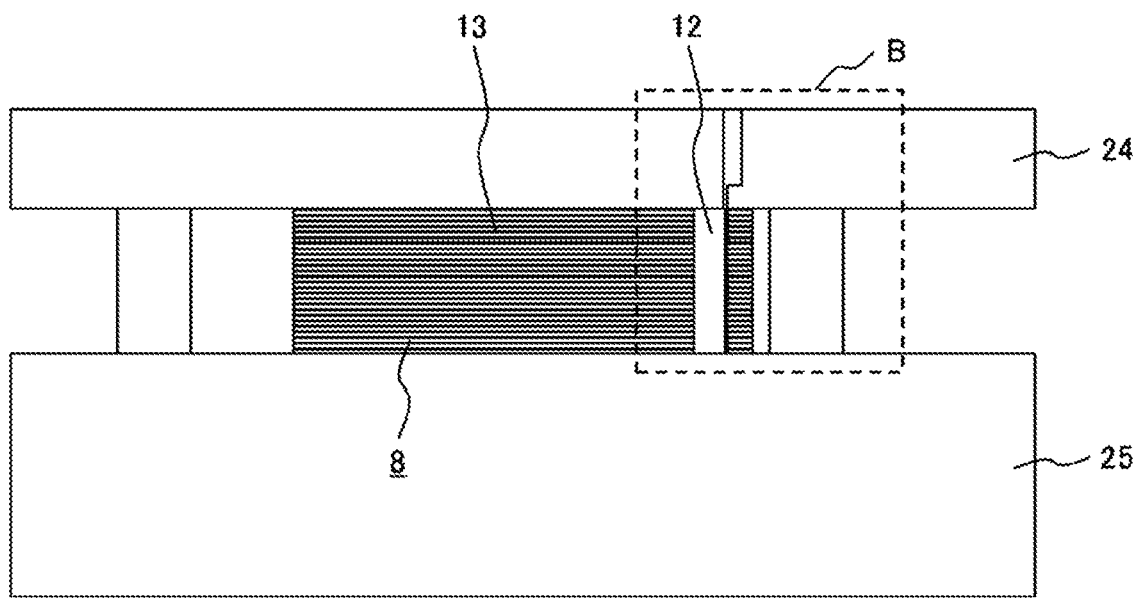
FIG. 6 is a view for describing injection of a filler when a gap, formed by chamfering shapes of corner portions of two permanent magnets in the rotor according to the first embodiment of the rotating electrical machine of the present invention is used as a filling inlet.

As illustrated in FIG. 6, the rotor 8 including the rotor core 13 provided with the magnet insertion hole 14 and the permanent magnet 12 inserted into the magnet insertion hole 14 is pressed and supported by an upper mold 24 and a lower mold 25 from the axial direction (vertical direction in FIG. 6).

Figure 7:
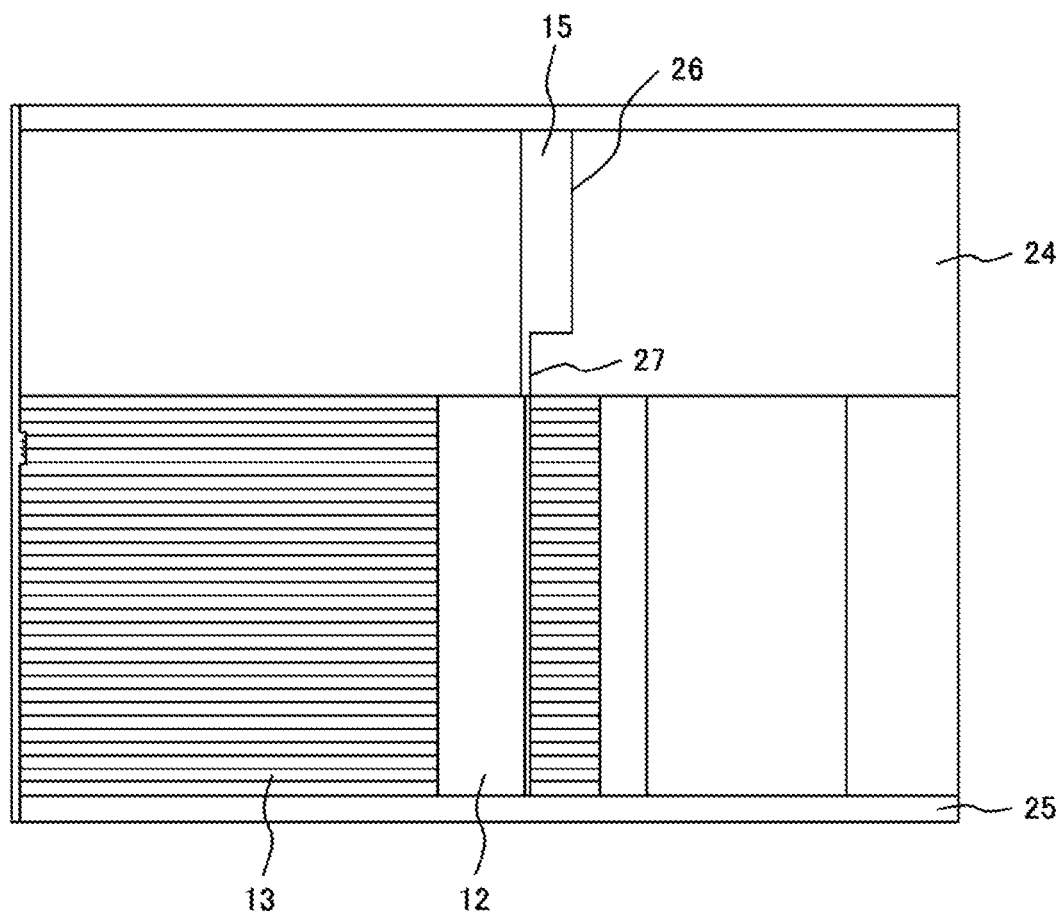
FIG. 7 is an enlarged view of a part B of FIG. 6.

In the upper mold 24, a filler storage portion 26 for the filler 15 is formed as illustrated in FIG. 7, and an injection portion 27 to inject the filler 15 is formed in a lower part of the filler storage portion 26. The filler 15 from the filler storage portion 26 is injected through injection portion 27 into the gaps (gaps each of which is formed between each of the two regions A where a side meets a side and the inner wall surface of the magnet insertion hole 14) G formed by the chamfered shapes of the two corner portions 21 of the permanent magnet 12 described above from the injection portion 27. As illustrated in the arrows C and D in FIG. 5, the filler 15 filled from the two gaps G flows between the first radial end surface 19*a* of the permanent magnet 12 and the outer circumferential end surface 22 of the magnet insertion hole 14 in one direction (arrow C) starting from the gap G and flows into the hole spaces 16 in the other direction (arrow D), thereby fixing the permanent magnet 12. Although FIG. 6 illustrates the example in which the filler 15 is injected from the upper mold 24 side, for example, the filler 15 may be press-fitted into the two gaps G from the lower mold 25 side.

Note that the invention is not limited to the above-described embodiments and includes various modifications.

For example, the above-described embodiments have been described in detail in order to describe the present invention in an easily understandable manner, and are not necessarily limited to one including the entire configuration that has been described above. Further, some configurations of a certain embodiment can be substituted by configurations of another embodiment, and further, a configuration of another embodiment can be also added to a configuration of a certain embodiment. Further, addition, deletion or substitution of other configurations can be made with respect to some configurations of each embodiment.

REFERENCE SIGNS LIST 1 vehicle
2 engine
3 rotating electrical machine
4 transmission
5 differential gear
6 wheel (drive wheel)
7 case
7*a* front bracket
7*b* rear bracket
7*c* housing
8 rotor
9 stator
10 shaft
11*a*, 11*b* bearing
12, 12*a*, 12*b* permanent magnet
13 rotor core
14 magnet insertion hole
15 filler
16 hole space
17 stator core
18 slot
19*a*, 19*b* first radial end surface of permanent magnet
20 a pair of circumferential end surfaces of permanent magnet
21 corner portion of permanent magnet
22 outer circumferential end surface of magnet insertion hole
23 inner circumferential end surface of magnet insertion hole
24 upper mold
25 lower mold
26 filler storage portion
27 filler injection portion

The invention claimed is:

1. A rotating electrical machine comprising:
a rotor; and
a stator,
wherein the rotor comprises: a rotor core provided with a plurality of magnet insertion holes; a permanent magnet inserted into the magnet insertion hole; and a filler configured to fix the permanent magnet to the magnet insertion hole,
the permanent magnet comprises: a plurality of radial end surfaces provided in a radial direction of the rotor; and a pair of circumferential end surfaces provided in a circumferential direction of the rotor, one first radial end surface out of the plurality of radial end surfaces intersecting the pair of circumferential end surfaces to form two regions where a side meets a side, and gaps each of which is formed between each of the two regions where a side meets a side and an inner wall surface of the magnet insertion hole are used as filler inlets for the filler such that there is no filling groove in a region through which magnetic flux of the rotor core passes.

2. The rotating electrical machine according to claim 1, wherein the two regions where a side meets a side are located on an outer circumferential side or an inner circumferential side of the permanent magnet.

3. The rotating electrical machine according to claim 1, wherein two corner portions where a side meets a side in the two regions where a side meets a side are subjected to chamfering or corner R processing.

4. The rotating electrical machine according to claim 1, wherein the magnet insertion hole has an inner wall surface facing the first radial end surface of the permanent magnet, and the inner wall surface of the magnet insertion hole has no inflection point in a region facing the first radial end surface.

5. The rotating electrical machine according to claim 1, wherein the magnet insertion hole has an inner wall surface facing the first radial end surface of the permanent magnet, and the inner wall surface of the magnet insertion hole is formed in a linear shape.

6. The rotating electrical machine according to claim 1, wherein the filler is interposed between the first radial end surface of the permanent magnet and an outer-circumferential-side inner wall surface of the magnet insertion hole.

7. The rotating electrical machine according to claim 6, wherein the filler is a thermosetting resin or a thermoplastic resin.

* * * * *